(12) United States Patent
Martinson

(10) Patent No.: US 8,776,322 B2
(45) Date of Patent: Jul. 15, 2014

(54) TIE WRAP FOR BUNDLING OBJECTS

(71) Applicant: Nite Ize, Inc., Boulder, CO (US)

(72) Inventor: Daniel J. Martinson, Medina, MN (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 13/784,455

(22) Filed: Mar. 4, 2013

(65) Prior Publication Data

US 2013/0174382 A1 Jul. 11, 2013

Related U.S. Application Data

(63) Continuation of application No. 12/247,523, filed on Oct. 8, 2008, now Pat. No. 8,387,216.

(51) Int. Cl.
*B65D 63/02* (2006.01)
*B65D 63/04* (2006.01)

(52) U.S. Cl.
USPC .................. 24/30.5 T; 24/16 PB; 24/16 R

(58) Field of Classification Search
USPC .................................. 24/16 PB, 16 R, 30.5 T
See application file for complete search history.

(56) References Cited

U.S. PATENT DOCUMENTS

| | | |
|---|---|---|
| 1,251,778 A | 1/1918 | Humble |
| 1,407,406 A | 2/1922 | Glazebrook |
| 2,118,875 A | 5/1938 | Windheim |
| 2,530,695 A | 11/1950 | Helmert |
| 2,542,601 A | 2/1951 | Van Cleef |
| 3,023,483 A | 3/1962 | Steiner |
| 3,214,309 A | 10/1965 | Di Leo et al. |
| 3,257,054 A | 6/1966 | Miesel |
| 3,426,393 A | 2/1969 | Mead |
| 3,543,353 A | 12/1970 | Meehan |
| 3,564,667 A | 2/1971 | Parrick, III et al. |
| 3,768,711 A | 10/1973 | Wilkinson |
| 3,806,358 A | 4/1974 | Glander et al. |
| 3,906,139 A | 9/1975 | Hiraoka et al. |
| 3,917,387 A | 11/1975 | Ensing |
| 3,930,288 A | 1/1976 | Black et al. |
| 3,947,927 A | 4/1976 | Rosenthal |
| 3,960,302 A | 6/1976 | Mazzoni, Jr. |
| 3,997,945 A | 12/1976 | Robins |
| 4,015,762 A | 4/1977 | Mendillo |

(Continued)

OTHER PUBLICATIONS

In the US Patent and Trademark Office U.S. Appl. No. 12/247,523 Final Office Action dated Aug. 16, 2012, 11 pages.

(Continued)

*Primary Examiner* — Robert J Sandy
*Assistant Examiner* — Louis Mercado
(74) *Attorney, Agent, or Firm* — Squire Patton Boggs (US) LLP

(57) ABSTRACT

A twist tie device having an elongated piece of shape-retaining deformable material. A cover covers the shape-retaining deformable material along the length of the elongated piece. The cover has a bond between the elongated piece and the cover. The bond between the cover and the elongated piece is along the entire interior surface of the cover. An outer cover may be bonded to the cover. The outer cover may have a gripping surface and a non-gripping surface. The gripping surface will provide more grip for the twist tie device when it is wrapped around itself and the gripping surface will provide more grip when it is wrapped around objects. A nongripping surface being generally smoother than the gripping surface is suitable for containing indicia.

2 Claims, 2 Drawing Sheets

(56) References Cited

U.S. PATENT DOCUMENTS

| | | | |
|---|---|---|---|
| 4,120,437 A | 10/1978 | Hara | |
| D250,631 S | 12/1978 | Stephenson | |
| 4,267,768 A * | 5/1981 | Cieslak et al. | 493/203 |
| 4,463,885 A | 8/1984 | Ball et al. | |
| 4,483,470 A | 11/1984 | Cousins | |
| 4,484,378 A | 11/1984 | Kimura et al. | |
| 4,488,748 A | 12/1984 | Burkes | |
| 4,531,661 A | 7/1985 | Santy | |
| D280,180 S | 8/1985 | Burt | |
| 4,540,006 A | 9/1985 | Collis | |
| 4,553,779 A | 11/1985 | Shortridge | |
| 4,641,454 A | 2/1987 | Ray et al. | |
| 4,648,414 A | 3/1987 | Fox et al. | |
| 4,666,417 A | 5/1987 | Hillman | |
| 4,679,387 A | 7/1987 | Weidenhaupt et al. | |
| 4,761,053 A | 8/1988 | Cogelia et al. | |
| 4,817,837 A | 4/1989 | Grover | |
| 4,834,118 A | 5/1989 | Goeller | |
| 4,856,689 A | 8/1989 | Shore | |
| 4,867,478 A | 9/1989 | Anderson | |
| 4,915,996 A | 4/1990 | Curry | |
| D308,205 S | 5/1990 | Tholberg | |
| D310,909 S | 10/1990 | Bradtl | |
| 5,054,299 A | 10/1991 | Maveety | |
| 5,056,820 A | 10/1991 | Des Prez | |
| 5,104,017 A | 4/1992 | Vandagriff | |
| 5,154,964 A * | 10/1992 | Iwai et al. | 428/156 |
| 5,190,336 A | 3/1993 | Palz | |
| 5,199,135 A | 4/1993 | Gold | |
| 5,310,376 A | 5/1994 | Mayuzumi et al. | |
| 5,342,687 A * | 8/1994 | Iwai et al. | 428/402 |
| 5,437,401 A | 8/1995 | Seltzer | |
| 5,468,036 A | 11/1995 | Brown | |
| 5,498,190 A | 3/1996 | Ganson | |
| 5,590,422 A | 1/1997 | Henderson | |
| 5,607,748 A * | 3/1997 | Feltman | 428/156 |
| D379,542 S | 5/1997 | Egashira | |
| 5,664,589 A | 9/1997 | Black | |
| 5,711,143 A | 1/1998 | Munakata et al. | |
| 5,714,211 A | 2/1998 | Zinbarg et al. | |
| 5,769,994 A | 6/1998 | Booz et al. | |
| D399,021 S | 9/1998 | Lam | |
| 5,827,461 A * | 10/1998 | Feltman | 264/177.1 |
| 5,853,212 A | 12/1998 | Daniel | |
| 5,916,006 A | 6/1999 | Ganson | |
| 6,081,695 A | 6/2000 | Wallace et al. | |
| 6,113,170 A | 9/2000 | Daniel | |
| 6,114,036 A | 9/2000 | Rinehart et al. | |
| 6,206,542 B1 | 3/2001 | Case et al. | |
| 6,237,740 B1 | 5/2001 | Weatherall et al. | |
| 6,332,052 B1 | 12/2001 | Luther et al. | |
| 6,372,344 B1 | 4/2002 | Castellani et al. | |
| D465,292 S | 11/2002 | Ko | |
| 6,473,944 B1 | 11/2002 | Vazin | |
| 6,478,282 B1 | 11/2002 | Flemming | |
| 6,527,482 B1 | 3/2003 | Stankus | |
| 6,742,685 B2 | 6/2004 | Williams | |
| 6,848,663 B2 | 2/2005 | Olive | |
| 7,011,879 B1 | 3/2006 | Contreras et al. | |
| D520,526 S | 5/2006 | Wuest et al. | |
| D531,339 S | 10/2006 | Lee et al. | |
| 7,123,801 B2 | 10/2006 | Fitz | |
| D536,116 S | 1/2007 | Sharrah | |
| 7,192,069 B1 | 3/2007 | Daniel | |
| 7,250,213 B2 | 7/2007 | Duncan | |
| 7,377,828 B2 | 5/2008 | Cheung | |
| D616,292 S | 5/2010 | Martinson | |
| D669,618 S | 10/2012 | Ormsbee et al. | |
| D669,619 S | 10/2012 | Ormsbee et al. | |
| D678,755 S | 3/2013 | Weidemann et al. | |
| 8,387,216 B1 | 3/2013 | Martinson | |
| D679,701 S | 4/2013 | Adelman et al. | |
| 2002/0028336 A1 | 3/2002 | Jaccoud | |
| 2002/0118535 A1 | 8/2002 | Nostrant | |
| 2005/0093205 A1 | 5/2005 | Martin et al. | |
| 2005/0211357 A1 | 9/2005 | Ren | |
| 2005/0274211 A1 | 12/2005 | Edgman | |
| 2005/0274425 A1 * | 12/2005 | Ostrander et al. | 138/144 |
| 2008/0124544 A1 | 5/2008 | Alexander et al. | |
| 2008/0223389 A1 * | 9/2008 | Harvie | 132/200 |
| 2008/0254281 A1 | 10/2008 | Chen et al. | |
| 2009/0095854 A1 | 4/2009 | Forbes et al. | |
| 2010/0294908 A1 | 11/2010 | Mish et al. | |
| 2011/0286217 A1 | 11/2011 | Martinson et al. | |
| 2013/0026316 A1 * | 1/2013 | Case et al. | 248/205.1 |
| 2013/0032617 A1 * | 2/2013 | Adelman et al. | 224/191 |
| 2013/0174382 A1 | 7/2013 | Martinson | |

OTHER PUBLICATIONS

In the US Patent and Trademark Office U.S. Appl. No. 12/247,523 Non-Final Office Action dated Jan. 31, 2012, 7 pages.
In the US Patent and Trademark Office U.S. Appl. No. 12/247,523 Non-Final Office Action dated Jul. 13, 2011, 9 pages.
In the US Patent and Trademark Office U.S. Appl. No. 13/196,762 Non-Final Office Action dated Mar. 26, 2013, 13 pages.
Acor Volara 4E foam padding, <URL:http://www.acor.com/volara.htm>, retrieved from Internet on Nov. 15, 2012.
ACOR, ACOR present Volara 4E, Mar. 2, 2008; http://acor.com/volara.htm.
Cruzerlite Razr Maxx case review, posted on Oct. 3, 2012, <URL:http://forums.androidcentral.com/droid-razr-maxx/213784-cruzerlite-razr-maxx-case-review.html>, retrieved from Internet on Nov. 14, 2012.
International Search Report dated Dec. 9, 2011, in related PCT Application No. PCT/US2011/046304, 3 pages.
International Search Report dated Oct. 18, 2012, in co-pending PCT Application No. PCT/US12/49309, 4 pages.
Nite Ize Connect Case for iPhone, Published on Aug. 17, 2012, by Nite Ize, Inc. <URL:http://www.youtube.com/watch?v=4LDiXufkDgY>, retrieved from Internet on Nov. 14, 2012.
Nite Ize Connect Mobile Mount, Posted Aug. 10, 2012, by Daniel Turk,<URL:http://www.maclife.com/article/reviews/best_case_scenario_nite_ize_connect_case_and_mobile_mount>, retrieved from Internet on Nov. 14, 2012.
Web page illustration from web site illustrating Grip Twist lock and carry device; griptwist.com; Dakota Trading corporation, 2008.
Web page illustration from web site illustrating reusable silicone coated Sili Twists; www.wrapables.com; Wrapables, 2008.
In the US Patent and Trademark Office U.S. Appl. No. 13/196,725 Non-Final Office Action dated Dec. 3, 2013, 6 pages.

* cited by examiner

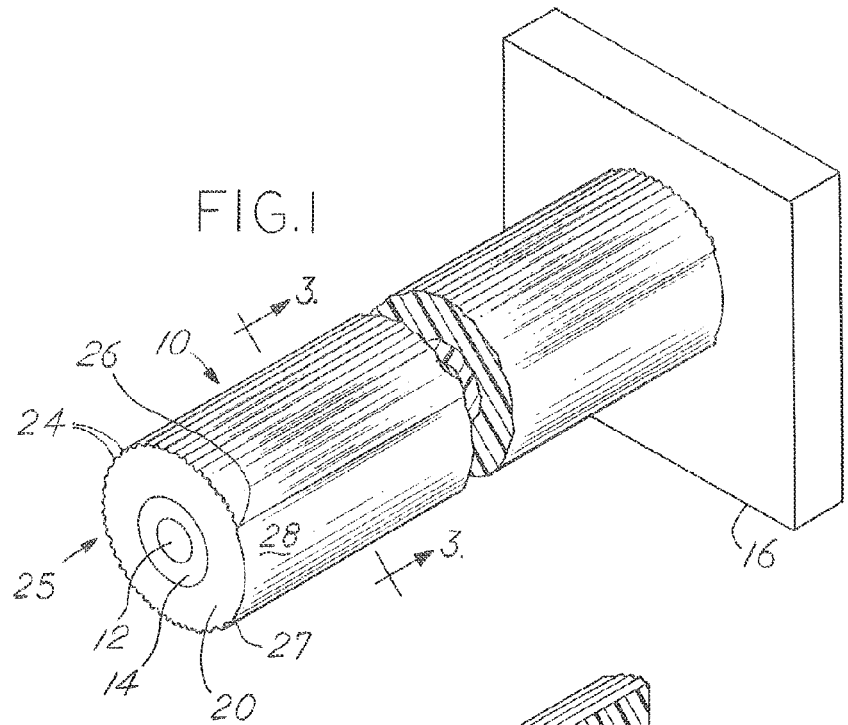
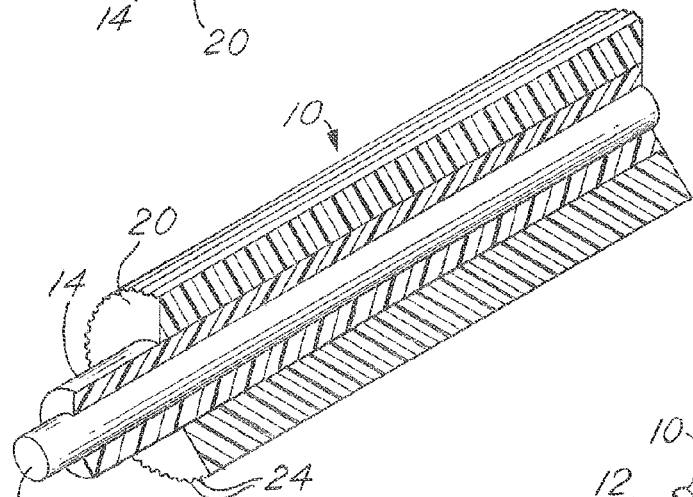
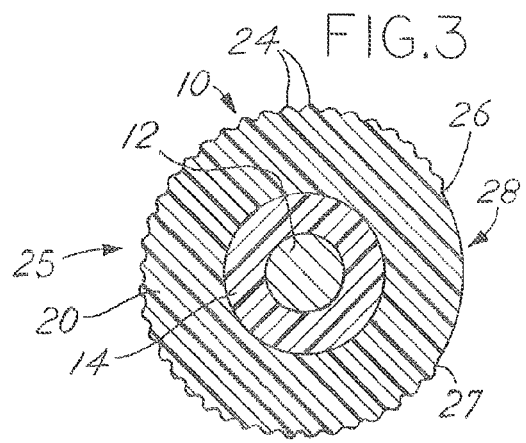

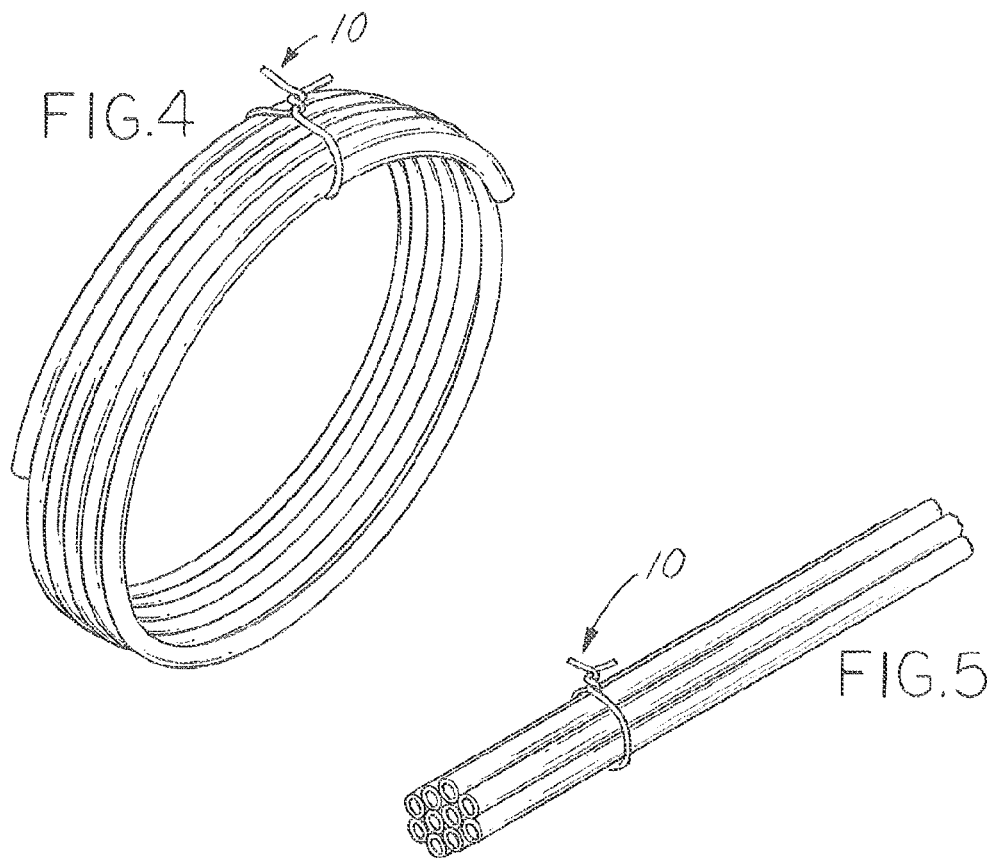
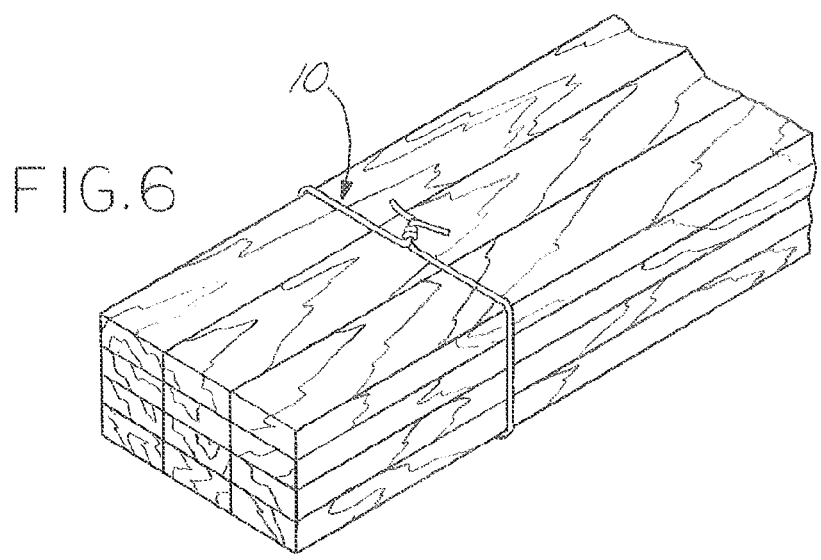

TIE WRAP FOR BUNDLING OBJECTS

CROSS REFERENCE TO RELATED APPLICATIONS

This application is a continuation of U.S. patent application Ser. No. 12/247,523 filed Oct. 8, 2008, now U.S. Pat. No. 8,387,216, the entirety of which is incorporated by reference herein.

BACKGROUND OF THE INVENTION

Twist ties are well known in the art and are typically not suitable supporting weight or bundling large objects. Twist ties are often found on packaging such as bread wrappers. These twist ties are usually a plastic or paper coating that covers a wire within the twist tie. The plastic or paper coating is not bonded to the wire and may be easily removed. Also, the coating provides little grip to the object on which the twist tie is wrapped. The coating does not grip itself well either.

U.S. Pat. No. 6,113,170 shows a wrap for bundling objects that includes a wire covered by a flexible tube, but there is no bonding between the wire and the tube. The invention of that patent also lacks a surface which enhances grip of the wrap when it is wrapped around itself or other objects.

SUMMARY OF THE INVENTION

The present invention relates to a twist tie device. The device has an elongated piece of shape-retaining deformable material. A cover covers the shape-retaining deformable material along the length of the elongated piece. The cover has a bond between the elongated piece and the cover. The bond between the cover and the elongated piece is along the entire interior surface of the cover. An outer cover may be bonded to the cover.

The outer cover may have a gripping surface and a non-gripping surface. The gripping surface will provide more grip for the twist tie device when it is wrapped around itself and the gripping surface will provide more grip when it is wrapped around objects. A nongripping surface being generally smoother than the gripping surface is suitable for containing indicia.

BRIEF DESCRIPTION OF THE DRAWINGS

FIG. 1 is a perspective sectional view of the twist tie device;
FIG. 2 is a perspective sectional view of the device shown in FIG. 1;
FIG. 3 is a sectional view taken about the line 3-3 in FIG. 1; and
FIGS. 4-6 show the twist tie device used to bundle articles.

DETAILED DESCRIPTION OF INVENTION

The present invention of a twist tie device 10 includes an elongated piece of shape-retaining deformable material, which is typically a metal wire 12. The wire 12 is typically a mild steel wire. The wire 12 will be flexible enough to be bent or tied into a particular shape necessary to accomplish a task, but still rigid enough to retain a shape into which it is bent. The diameter of the wire 12 also affects flexibility and shape retention. A diameter 0.62 provides both flexibility and necessary shape retention; however, other diameters may be used depending on the application for which the twist tie device 10 will be used. A cover 14 is bonded to the wire 12 along its entire length. The cover is formed by coextruding the wire 12 through an extrusion head 16 along with a polymer. The wire 12 is first heated to approximately 300-400 degrees Fahrenheit and then drawn through the extrusion head 16. As the wire 12 moves through the extrusion head 16 a layer of liquid polymer is deposited evenly around the wire 12 to form the cover 14. During this process, the polymer forming the cover 14 is cured so that it adheres to the wire 12. This forms a bond around the entire perimeter of the wire 12 and along the entire length of the wire 12. The bond prevents the wire 12 from slipping out of the cover 14. The polymer used to make the cover 14 is typically a solid thermoplastic polymer, such as 85A Duro EXXON SANTOPRENE® 8291-85TL, or a similar type of polymer. EXXON SANTOPRENE® is particularly well suited as a cover 14 material because it is formulated to bond to metal. The durometer of the EXXON SANTOPRENE® cover 14 is 85A, which is fairly tough yet flexible. An advantage of using a solid polymer such as EXXON SANTOPRENE® is that it is resilient and will resist taking a compression set when it is compressed for an extended amount of time.

An outer cover 20 can be coextruded over the cover. This outer cover 20 is typically a different material than the cover 14. The material of the outer cover 20 is typically softer and of a lower durometer. A suitable material for the outer cover 20 is 15A Duro TEKNOR APEX® Uniprene UN-2005 TPV. This is a solid thermoplastic polymer. The lower durometer of the outer cover 20 provides a high friction surface. The generally high friction of the outer cover 20 may be increased further by extruding ribs 24 into the outer surface as shown in FIG. 3 to define a texturized gripping surface 25. The gripping surface 25 extends between points 26 and 27 on the left side of the twist tie device 10 as shown in FIG. 3. The gripping surface 25 is well suited to provide a strong grip when the twist tie device 10 is wrapped around itself, and provides friction when the device is wrapped around objects. The texturized gripping surface 25 may have other embossed patterns that provide a texturized surface; however, ribs 24 are well suited to the extrusion process by which the twist tie device 10 is made. A non-gripping surface 28 extends between points 26 and 27 on the right side of the twist tie device 10 as shown in FIG. 3. The non-gripping surface 28 is characterized by a smoother texture than the gripping surface 25. Indicia, such as logos or other labels, may be placed on the non-gripping surface 28 and will be easier to read than if placed on the gripping surface 25.

The cover 14 and outer cover 20 are bonded tightly so that no water may enter between the wire 12 and either cover 14, 20. However, the ends of the wire 12 are not protected by either cover 14, 20. The ends of the wire may be coated with a protective paint or clear coat to prevent corrosion of the ends of the wire 12, but this is not necessary.

The twist tie 10 may be used by beginning with the tie wrap 10 in a generally straightened position. Articles to be bundled can be gathered into manageable bundles as shown in FIGS. 4-6. The twist tie 10 may be wrapped around each bundle of articles then twisted to form loops around each bundle. The outer cover 20 will provide a high friction gripping surface that will prevent articles contacting the tie wrap 10 from sliding out of the tie wrap 10. The soft outer cover 20 will not scratch surfaces of articles within the tie wrap 10. The tie wrap 10 can be left in its twisted position around bundled articles for as long as necessary. The resilient cover 14 and outer cover 20 will resist taking a permanent set due to being compressed due to twisting the twist tie 10 together, or compression due to pressure exerted on the articles within the twist tie 10. Due to the durable construction of the twist tie 10 it may be used effectively in temperatures from −50 degrees F.

to 200 degrees F. Additionally, the covers 14, 20 will prevent the twist tie device 10 from breaking if the wire 12 were to break because the bond between the cover 14 and the wire 12 will prevent the wire 12 from exiting the covers 14, 20.

The invention is not limited to the details given above, but may be modified within the scope of the following claims.

What is claimed is:

1. A twist tie device comprising:
    an elongated piece of shape-retaining deformable material;
    a cover covering the shape-retaining deformable material along a length of the elongated piece, the cover and the shape-retaining deformable material being bonded along their length; and
    an outer cover covering the cover, the outer cover bonded to the cover, wherein the cover has an interior surface, the cover being bonded to said elongated piece of shape-retaining deformable material along the entire interior surface of said cover, wherein the cover and the outer cover resist taking a permanent set due to being compressed or twisted, due to a bonded nature of the elongated piece, cover, and outer cover; and a break in the elongated piece is prevented from exiting the outer cover and the cover, due to the bonded nature of the elongated piece, cover, and outer cover.

2. A twist tie device comprising:
    an elongated piece of shape-retaining deformable material;
    a cover covering the shape-retaining deformable material along a length of the elongated piece, the cover and the shape-retaining deformable material being bonded along their length; and
    an outer cover covering the cover, the outer cover bonded to the cover, wherein the cover has an interior surface, the cover being bonded to said elongated piece of shape-retaining deformable material along the entire interior surface of said cover, wherein the cover and the outer cover resist taking a permanent set due to being compressed or twisted, due to a bonded nature of the elongated piece, cover, and outer cover; and wherein a break in the elongated piece does not cause the twist tie to break, due to the bonded nature of the elongated piece, cover, and outer cover.

* * * * *